United States Patent
Yukawa

(10) Patent No.: US 9,849,732 B2
(45) Date of Patent: Dec. 26, 2017

(54) PNEUMATIC TIRE WITH SIDE WALL HAVING CIRCUMFERENTIAL ROWS OF DIMPLES

(71) Applicant: SUMITOMO RUBBER INDUSTRIES, LTD., Kobe-shi (JP)

(72) Inventor: Naoki Yukawa, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 704 days.

(21) Appl. No.: 14/265,446

(22) Filed: Apr. 30, 2014

(65) Prior Publication Data

US 2015/0053325 A1 Feb. 26, 2015

(30) Foreign Application Priority Data

Aug. 21, 2013 (JP) .................................. 2013-171009

(51) Int. Cl.
*B60C 13/02* (2006.01)
*B60C 23/19* (2006.01)
(Continued)

(52) U.S. Cl.
CPC .............. *B60C 13/02* (2013.01); *B60C 23/19* (2013.01); *B60C 17/0009* (2013.01); *B60C 2013/007* (2013.01)

(58) Field of Classification Search
CPC ....... B60C 13/02; B60C 13/023; B60C 13/00; B60C 23/18; B60C 23/19; B60C 17/0009; B60C 17/00; B60C 2013/007
(Continued)

(56) References Cited

U.S. PATENT DOCUMENTS 6,382,286 B1 * 5/2002 Minagawa
2011/0030862 A1 * 2/2011 Hayashi .................. B60C 13/02
(Continued)

FOREIGN PATENT DOCUMENTS

EP   2 431 197 A1   3/2012
EP   2 546 074 A1   1/2013
(Continued)

OTHER PUBLICATIONS

Extended European Search Report issued Dec. 23, 2014 in Patent Application No. 14169559.3.

*Primary Examiner* — Adrienne C Johnstone
(74) *Attorney, Agent, or Firm* — Oblon, McClelland, Maier & Neustadt, L.L.P.

(57) ABSTRACT

A pneumatic tire has a side wall having a side surface and dimples formed on the side surface. The side surface has the tire maximum width point, the dimples are aligned along circumferential rows in concentric form with respect to the tire axis such that the dimples form lateral ribs and longitudinal ribs, the lateral ribs each have radially outer side surface and radially inner side surface and include first and second ribs, the first rib is formed such that the height from the dimple bottom at the inner side surface and the height from the dimple bottom at the outer side surface are equal, the second rib is formed such that the height from the dimple bottom at the inner side surface is greater than the height from the dimple bottom at the outer side surface, and the second rib is positioned radially inward from the maximum width point.

20 Claims, 10 Drawing Sheets

(51) Int. Cl.
*B60C 17/00* (2006.01)
*B60C 13/00* (2006.01)

(58) Field of Classification Search
USPC .......................................... 152/523, 153, 517
See application file for complete search history.

(56) References Cited

U.S. PATENT DOCUMENTS

2011/0036475 A1* 2/2011 Kojima .................. B60C 13/02
2012/0060994 A1 3/2012 Hayashi et al.
2013/0037194 A1 2/2013 Hino et al.
2014/0144565 A1 5/2014 Yukawa
2014/0238572 A1 8/2014 Imamura

FOREIGN PATENT DOCUMENTS

| JP | 2010-274886 | 12/2010 |
| WO | WO 2013/018644 A1 | 2/2013 |
| WO | WO 2013/054684 A1 | 4/2013 |

* cited by examiner

PRIOR ART

PNEUMATIC TIRE WITH SIDE WALL HAVING CIRCUMFERENTIAL ROWS OF DIMPLES

CROSS-REFERENCE TO RELATED APPLICATIONS

The present application is based upon and claims the benefit of priority to Japanese Patent Application No. 2013-171009, filed Aug. 21, 2013, the entire contents of which are incorporated herein by reference.

BACKGROUND OF THE INVENTION

Field of the Invention

The present invention relates to a pneumatic tire, more specifically, to an improvement of a side surface of a tire.

Description of Background Art

There is a runflat tire having a load bearing layer inside a sidewall. Highly stiff crosslinked rubber may be used for the load bearing layer. Such a runflat tire is referred to as a side reinforcement type. When such a type of runflat tire is punctured and its inner pressure is reduced, the load bearing layer supports the load. The load bearing layer suppresses deformation of the tire when it is deflated. Even when a deflated tire continues to run, the highly stiff crosslinked rubber suppresses heat generation at the load bearing layer. A runflat tire is capable of running for a certain distance even when it is deflated. When a vehicle is equipped with runflat tires, carrying spare tires can be eliminated. When using runflat tires, changing a flat tire in inconvenient places can be avoided.

JP 2010-274886 A describes a runflat tire provided with multiple dimples on the outer surface of the sidewall. The entire contents of this publication are incorporated herein by reference.

SUMMARY OF THE INVENTION

According to one aspect of the present invention, a pneumatic tire has a side wall having a side surface and dimples formed on the side surface. The side surface has the tire maximum width point, the dimples are aligned along multiple circumferential rows formed in a concentric form with respect to a tire axis such that the dimples in the circumferential rows form lateral ribs between radially adjacent dimples and longitudinal ribs between circumferentially adjacent dimples, the lateral ribs each have a radially outer side surface and a radially inner side surface and include a first lateral rib and a second lateral rib, the first lateral rib is formed such that the height from the dimple bottom to the upper edge at the inner side surface and the height from the dimple bottom to the upper edge at the outer side surface are equal, the second lateral rib is formed such that the height from the dimple bottom to the upper edge at the inner side surface is set greater than the height from the dimple bottom to the upper edge at the outer side surface, and the second lateral rib is positioned radially inward from the tire maximum width point.

According to another aspect of the present invention, a pneumatic tire includes a tread, a pair of sidewalls extending inward from the edges of the tread in a radial direction, respectively, a pair of beads positioned inward from the sidewalls in the radial direction, respectively, and a carcass bridging between the beads such that the carcass is extending along an inner side of the tread and sidewalls. The pair of side walls includes a side wall having a side surface and dimples formed on the side surface, the side surface has the tire maximum width point, the dimples are aligned along circumferential rows formed in a concentric form with respect to the tire axis such that the dimples in the circumferential rows form lateral ribs between radially adjacent dimples and longitudinal ribs between circumferentially adjacent dimples, the lateral ribs each have a radially outer side surface and a radially inner side surface and include a first lateral rib and a second lateral rib, the first lateral rib is formed such that the height from the dimple bottom to the upper edge at the inner side surface and the height from the dimple bottom to the upper edge at the outer side surface are equal, the second lateral rib is formed such that the height from the dimple bottom to the upper edge at the inner side surface is set greater than the height from the dimple bottom to the upper edge at the outer side surface, and the second lateral rib is positioned radially inward from the tire maximum width point.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
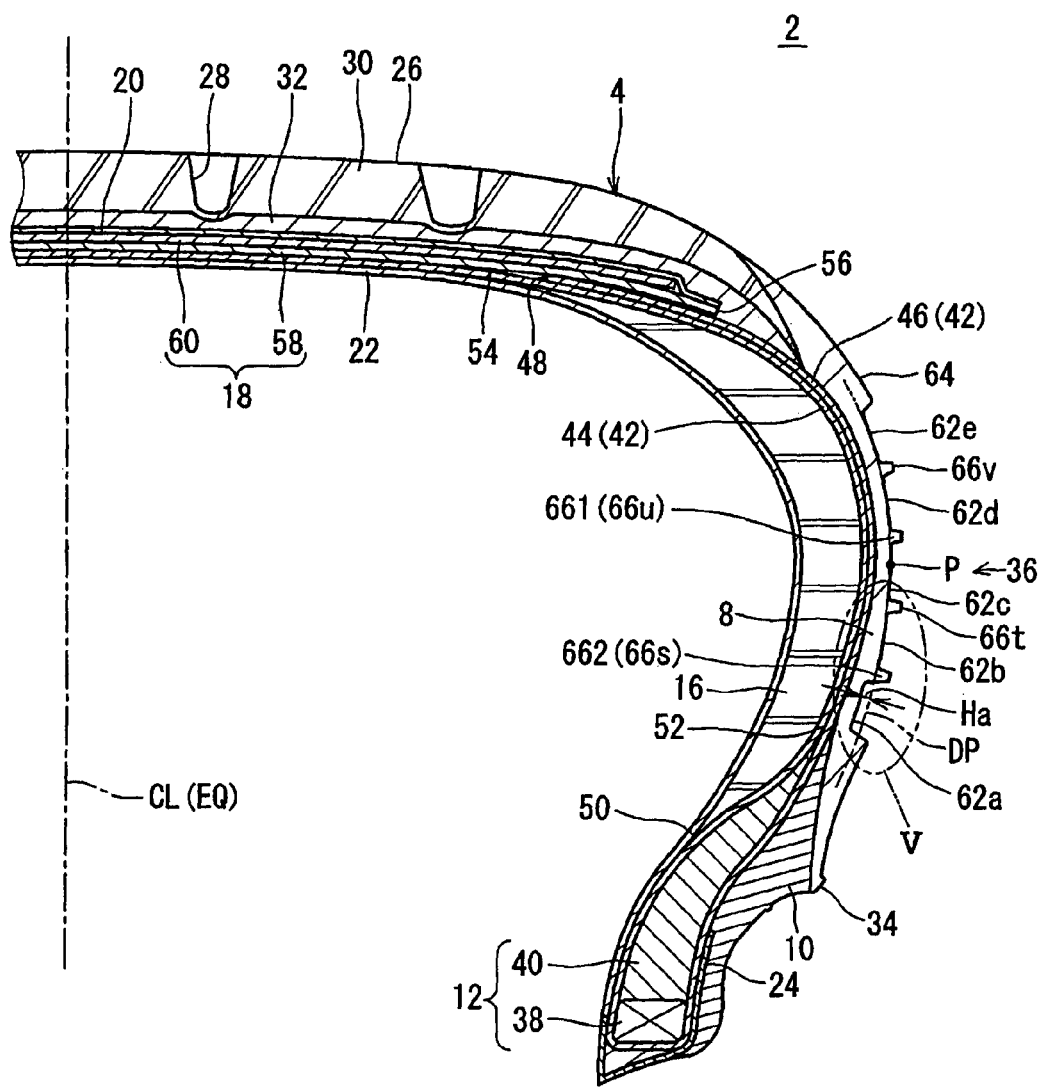
FIG. 1 is a cross-sectional view, cut with a plane perpendicular to a circumferential direction, showing a tire according to an embodiment of the present invention.

The embodiments will now be described with reference to the accompanying drawings, wherein like reference numerals designate corresponding or identical elements throughout the various drawings.

Figure 2:
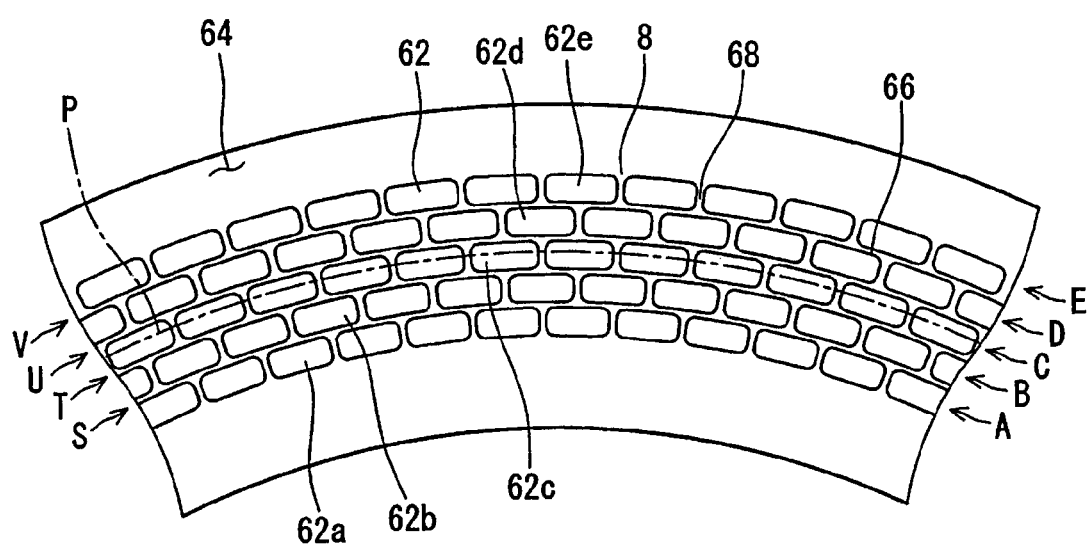
FIG. 2 is a front view showing part of the outer surface of a sidewall of the tire in FIG. 1.

FIGS. 1 and 2 show runflat tire 2. In FIG. 1, a direction toward the upper or lower portion is a radial direction of tire 2, a direction to the left or right is an axial direction of tire 2, and a direction perpendicular to the drawing sheet is a circumferential direction of tire 2. In FIG. 1, center line (CL) shown in a dotted line also indicates an equator plane (EQ)

of tire 2. Point (P) in FIG. 1 indicates the position where the maximum width of the tire is measured.

Tire 2 is provided with tread 4, sidewall 8, clinch section 10, bead 12, carcass 14, load bearing layer 16, belt 18, band 20, inner liner 22 and chafer 24. Belt 18 and band 20 form a reinforcement layer. The reinforcement layer may be made up of belt 18 only. The reinforcement layer may also be made up of band 20 only.

Tread 4 is in a convex shape protruding outward in a radial direction. Tread 4 forms tread surface 26 which makes contact with road surfaces. Grooves 28 are formed in tread surface 26. A tread pattern is formed by grooves 28. Tread 4 is provided with cap layer 30 and base layer 32. Cap layer 30 is made of crosslinked rubber. Base layer 32 is made of another crosslinked rubber. Cap layer 30 is positioned at a radially outer side of base layer 32. Cap layer 30 is laminated on base layer 32.

Sidewall 8 extends substantially inward from the edge of tread 4 in a radial direction. Sidewall 8 is made of crosslinked rubber. Sidewall 8 prevents external damage to carcass 14. Sidewall 8 is provided with protector rib 34. Protector rib 34 protrudes outward in an axial direction. When a tire runs flat, protector rib 34 makes contact with a rim flange (not shown). Because of such contact, bead 12 is prevented from deforming. When tire 2 is prevented from deforming, its ability to run flat is excellent.

Thermal conductivity of sidewall 8 is preferred to be no lower than 0.1 W/m/K. When a tire runs flat, sufficient heat radiation is achieved from sidewall 8. From the viewpoint of heat radiation, the thermal conductivity is more preferred to be no lower than 0.2 W/m/K. When fiber with excellent thermal conductivity is dispersed in the rubber of sidewall 8, significant thermal conductivity is achieved.

Clinch section 10 is positioned substantially inward from sidewall 8 in a radial direction. Clinch section 10 is positioned outside bead 12 and carcass 14 in an axial direction. Clinch section 10 makes contact with a rim flange.

Bead 12 is positioned radially inward from sidewall 8. Bead 12 is provided with core 38 and apex 40 which extends radially outward from core 38. Core 38 has an annular shape and includes a wound non-expandable wire (typically a steel wire). Apex 40 tapers radially outward. Apex 40 is made of highly stiff crosslinked rubber.

Carcass 14 is formed with carcass ply 42. Carcass ply 42 bridges between beads 12 on each side and extends along tread 4 and sidewall 8. Carcass ply 42 is turned up around core 38 from the axial inner side toward the outer side. Due to such a turn-up structure, main portion 44 and turn-up portion 46 are formed in carcass ply 42. Edge 48 of turn-up portion 46 is extended to a point directly below belt 18. In other words, turn-up portion 46 overlaps belt 18. Carcass 14 has a so-called "super-high turn-up structure." Carcass 14 with a super-high turn-up structure contributes to the durability of tire 2 when it runs flat. Carcass 14 contributes to the durability of the tire in a deflated state.

Although not shown in the drawings, carcass ply 42 is made up of multiple cords arrayed parallel to each other and a topping rubber. The absolute value of the angle each cord makes with respect to equator plane (EQ) is at 45 to 90 degrees or 75 to 90 degrees. In other words, carcass 14 has a radial structure. Cords are made of organic fiber. Preferred examples of organic fiber are polyester fiber, nylon fiber, rayon fiber, polyethylene naphthalate fiber, and aramid fiber.

Load bearing layer 16 is at an axially inward position of sidewall 8. Load bearing layer 16 is sandwiched between carcass 14 and inner liner 22. Load bearing layer 16 tapers radially both inward and outward. Load bearing layer 16 is shaped similar to a crescent. Load bearing layer 16 is made of highly stiff crosslinked rubber. When tire 2 is in a deflated state, load bearing layer 16 supports the load. Because of load bearing layer 16, tire 2 is capable of running for a certain distance even when it is deflated. Runflat tire 2 is a side reinforcement type. Tire 2 may also have a load bearing layer with a shape different from that of load bearing layer 16 shown in FIG. 1.

Of carcass 14, the portion that overlaps load bearing layer 16 is positioned away from inner liner 22. In other words, carcass 14 is curved because of load bearing layer 16. When a tire runs flat, a compression load is exerted on load bearing layer 16, and a tensile load is exerted on the region of carcass 14 positioned close to load bearing layer 16. Since load bearing layer 16 is a block of rubber, it has an excellent ability to bear a compression load. The cords of carcass 14 are capable of bearing tensile load. Load bearing layer 16 and carcass cords suppress tire 2 from vertical deformation when a tire runs flat. Tire 2 with suppressed vertical deformation exhibits excellent steering stability when it runs flat.

From the viewpoint of suppressing vertical deformation when a tire runs flat, the hardness value of load bearing layer 16 is preferred to be no less than 60, more preferably no less than 65. From the viewpoint of riding comfort when tire 2 is in a normal state, the hardness value is preferred to be no greater than 90, more preferably no greater than 80. Hardness is measured based on "JIS K6253" using a type A durometer. A durometer is pushed against the cross section shown in FIG. 1 to measure the degree of rubber hardness. Measurements are conducted at a temperature of 23° C.

Lower edge 50 of load bearing layer 16 is positioned radially inward from upper edge 52 of apex 40 (namely, the radially outer edge of the bead). In other words, load bearing layer 16 overlaps apex 40. The distance in a radial direction between lower edge 50 of load bearing layer 16 and upper edge 52 of apex 40 is preferred to be no less than 5 mm and no greater than 50 mm. Uniform hardness distribution is achieved in tire 2 having a distance in such a range. The distance is more preferred to be no less than 10 mm and no greater than 40 mm.

Upper edge 54 of load bearing layer 16 is positioned axially inward from edge 56 of belt 18. In other words, load bearing layer 16 overlaps belt 18. The distance in an axial direction between upper edge 54 of load bearing layer 16 and edge 56 of belt 18 is preferred to be no less than 2 mm and no greater than 50 mm. Uniform hardness distribution is achieved in tire 2 having a distance in such a range. The distance is more preferred to be no less than 5 mm and no greater than 40 mm.

From the viewpoint of suppressing vertical deformation when a tire runs flat, the maximum thickness of load bearing layer 16 is preferred to be no less than 3 mm, more preferably no less than 4 mm, and is especially preferred to be no less than 7 mm. From the viewpoint of making tire 2 lightweight, the maximum thickness is preferred to be no greater than 25 mm, more preferably no greater than 20 mm.

The thermal conductivity of load bearing layer 16 is preferred to be no lower than 0.2 W/m/K. When a tire runs flat, heat from load bearing layer 16 is conveyed to other members. From a conductivity point of view, thermal conductivity is more preferred to be no less than 0.3 W/m/K. When fiber with excellent thermal conductivity is dispersed in the rubber of load bearing layer 16, significant thermal conductivity is achieved.

Belt 18 is positioned radially outward from carcass 14. Belt 18 is laminated on carcass 14. Belt 18 reinforces carcass 14. Belt 18 is made up of inner layer 58 and outer layer 60.

As is clear in FIG. 1, the width of inner layer 58 is slightly greater than the width of outer layer 60. Although not shown in the drawings, inner layer 58 and outer layer 60 are each made of multiple cords arranged parallel to each other and a topping rubber. Each cord makes inclination with respect to equator plane (EQ). The absolute value of the inclination angle is usually no smaller than 10 degrees but no greater than 35 degrees. The inclination direction of cords in inner layer 58 with respect to equator plane (EQ) is opposite the inclination direction of cords in outer layer 60 with respect to equator plane (EQ). The preferred material of cords is steel. Organic fiber may also be used as cords. Belt 18 may have three or more layers.

Band 20 covers belt 18. Although not shown in the drawings, band 20 is made of cords and a topping rubber. The cords are wound to be helical. Band 20 has a so-called jointless structure. The cords extend in a substantially circumferential direction. The angle of the cords with respect to a circumferential direction is set at no greater than 5 degrees, preferably at no greater than 2 degrees. Since belt 18 is confined by the cords, belt 18 is suppressed from being lifted. The cords are made of organic fiber. Preferred examples of organic fiber are nylon fiber, polyester fiber, rayon fiber, polyethylene naphthalate fiber and aramid fiber.

Instead of band 20, tire 2 may be provided with a so-called edge band, which covers only the vicinity of edge 56 of belt 18. Alternatively, tire 2 may be provided with an edge band as well as band 20.

Inner liner 22 is bonded to the inner circumferential surface of carcass 14. Inner liner 22 is made of crosslinked rubber. A rubber with an excellent air shielding capability is used for inner liner 22. Inner liner 22 maintains the inner pressure of tire 2.

As shown in FIGS. 1 and 2, tire 2 is provided with numerous dimples 62 on side surface 36. In the embodiments of the present invention, side surface 36 means a region of the outer surface of tire 2 that is visible from an axial direction. Typically, dimples 62 are formed to be recessed from the surface of sidewall 8.

Of side surface 36, portions other than dimples 62 are lands 64. Of lands 64, portions positioned among dimples 62 are referred to as ribs. Ribs include lateral rib 66 positioned between radially adjacent dimples 62 and longitudinal rib 68 positioned between circumferentially adjacent dimples 62.

Figure 3:
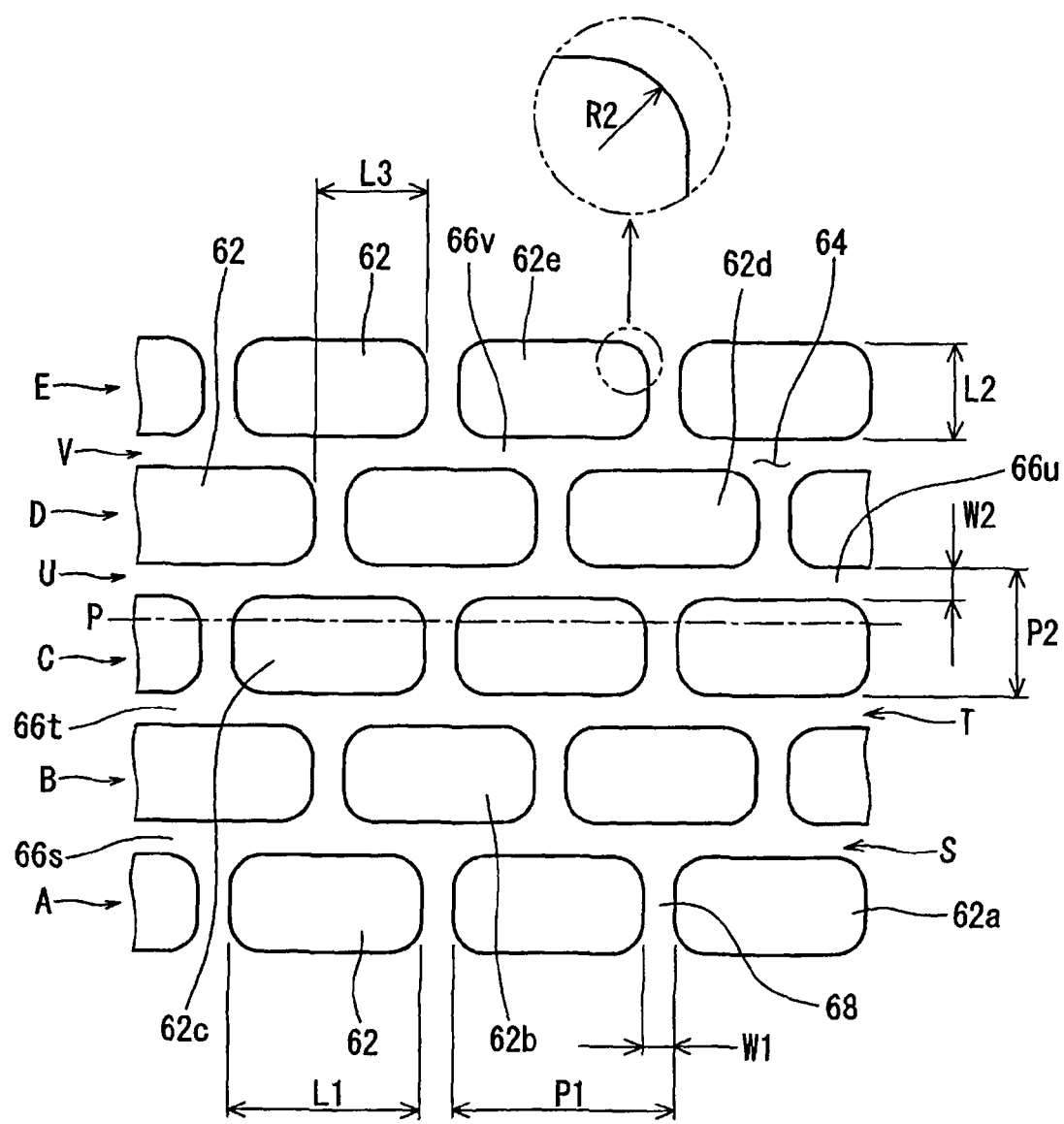
FIG. 3 is an enlarged front view showing part of the outer surface of the sidewall in FIG. 2.

FIG. 3 is an enlarged front view showing part of sidewall 8 of the tire 2 in FIG. 1. In FIG. 3, a direction to the left or right is a circumferential direction, and a direction to the upper or lower portion is a radial direction. FIG. 3 shows numerous dimples 62. The outline of each dimple 62 is substantially rectangular. In other words, dimple 62 has a circumferential length that is greater than its radial length. The same dimples 62 may also be formed in clinch section 10.

When a vehicle runs, air turbulence is generated by dimples 62. The turbulence facilitates heat radiation from sidewall 8. It is easier to maintain turbulence in dimple 62 with a circumferential length that is greater than the radial length. Temperature in tire 2 is less likely to rise even when the tire runs flat. Tire 2 exhibits excellent durability when it runs flat.

Arrow (L1) in FIG. 3 is a circumferential length of dimple 62. From the viewpoint of maintaining turbulence and from the viewpoint of making tire 2 lightweight, length (L1) is preferred to be no less than 4 mm, and is especially preferred to be no less than 10 mm. To generate turbulence in numerous dimples, length (L1) is preferred to be no greater than 55 mm. Arrow (L2) in FIG. 3 is a radial length of dimple 62. From the viewpoint of making tire 2 lightweight, length (L2) is preferred to be no less than 2 mm, and is especially preferred to be no less than 5 mm. To generate turbulence in numerous dimples, length (L2) is preferred to be no greater than 35 mm.

When seen in a front view, the corners of dimple 62 are rounded. From the viewpoint of dirt being less likely to be stuck in corners, curvature radius (R2) of rounded corners is preferred to be no less than 0.5 mm, and is especially preferred to be no less than 1.0 mm. From the viewpoint of making a tire lightweight, curvature radius (R2) is preferred to be no greater than 3.0 mm, and is especially preferred to be no greater than 2.5 mm.

The outline of each dimple 62 is symmetrical along a radially extending straight line. Heat radiation effects by dimples do not depend on rotation directions.

FIG. 1 through FIG. 3 show dimples (62a) on first row (A), dimples (62b) on second row (B), dimples (62c) on third row (C), dimples (62d) on fourth row (D) and dimples (62e) on fifth row (E) in that order from the bead side toward the tread side. Dimples 62 in first row (A) to fifth row (E) are all aligned in a circumferential direction. Each of all the dimple rows is aligned along a circular line. All dimples are aligned as concentric circles with respect to the tire rotation axis.

In the present embodiment, first dimple row (A) is positioned in an approximate vicinity of a radially outer edge of apex 40. Third dimple row (C) is positioned in the region that includes tire maximum width point (P). Fifth dimple row (E) is positioned in the vicinity of a buttress section. However, those are not the only options for the dimple structure.

In the present embodiment, circumferential rows of lateral ribs 66 are formed among dimple rows positioned radially adjacent to each other. In the present embodiment, lateral rib (66s) of first row (S) is formed between first dimple row (A) and second dimple row (B); lateral rib (66t) of second row (T) is formed between second dimple row (B) and third dimple row (C); lateral rib (66u) of third row (U) is formed between third dimple row (C) and fourth dimple row (D); and lateral rib (66v) of fourth row (V) is formed between fourth dimple row (D) and fifth dimple row (E). The lateral rib rows are each formed as a circle. All lateral rib rows are aligned concentrically with respect to the tire rotation axis.

In the present embodiment, the number of dimple rows is five. The number of dimple rows is preferred to be two or greater. By setting circumferential length (L1) to be shorter than radial length (L2), two or more dimple rows can be formed. The number of dimple rows is preferred to be no greater than six, more preferably no greater than four.

As is clear in FIGS. 1 and 3, dimples (62a) in first row (A) are aligned to be staggered from dimples (62b) in second row (B). In such sidewall 8, positions where turbulence is generated will not be unbalanced. Likewise, dimples (62b) in second row (B) are aligned to be staggered from dimples (62c) in third row (C); dimples (62c) in third row (C) are aligned to be staggered from dimples (62d) in fourth row (D); and dimples (62d) in fourth row (D) are aligned to be staggered from dimples (62e) in fifth row (E). Heat radiation from sidewall 8 is facilitated in tire 2.

Arrow (L3) in FIG. 3 is the circumferential distance between the position of a dimple (62a) of the first row and the position of a dimple (62b) of the second row. From the viewpoint of setting unbalanced positions for turbulence to be generated, distance (L3) is preferred to be no less than 3.0 mm, and is especially preferred to be no less than 7.0 mm.

Following distances are each preferred to be in the above range: the circumferential distance between a dimple (62b) of second row (B) and a dimple (62c) of third row (C); the circumferential distance between a dimple (62c) of third row (C) and a dimple (62d) of fourth row (D); the circumferential distance between a dimple (62d) of fourth row (D) and a dimple (62e) of fifth row (E).

Arrow (P1) in FIG. 3 indicates a circumferential pitch of dimples 62. From the viewpoint of setting dimples 62 with greater length (L1), pitch (P1) is preferred to be no less than 5 mm, and is especially preferred to be no less than 12 mm. From the viewpoint of generating turbulence at numerous positions, pitch (P1) is preferred to be no greater than 60 mm. Arrow (P2) in FIG. 3 indicates a radial pitch of dimples 62. To set dimples 62 with greater length (L2), pitch (P2) is preferred to be no less than 2 mm, and is especially preferred to be no less than 6 mm. From the viewpoint of generating turbulence at numerous positions, pitch (P2) is preferred to be no greater than 40 mm.

In FIG. 3, arrow (W1) indicates the width of a longitudinal rib 68, and arrow (W2) indicates the width of a lateral rib 66. From the viewpoint of low wear in lands 64, widths (W1, W2) are preferred to be no less than 0.3 mm, especially preferred to be no less than 1 mm. From the viewpoint of making tire 2 lightweight, widths (W1) and (W2) are preferred to be no greater than 3 mm, and are especially preferred to be no greater than 2 mm.

In the embodiments of the present invention, "the rate of occupied area" means the proportion of the outlined area of a dimple 62 to the base area. The base area is the area of a rectangle whose long side is the same as the circumferential pitch (P1) and short side is the same as the radial pitch (P2). From the viewpoint of making tire 2 lightweight, the rate of the occupied area is preferred to be no less than 75%, and is especially preferred to be no less than 79%. Lightweight tire 2 exhibits excellent fuel consumption, steering stability and riding comfort. From the viewpoint of low wear on lands 64, the rate of the occupied area is preferred to be no greater than 93%, and is especially preferred to be no greater than 92%.

Figure 4:
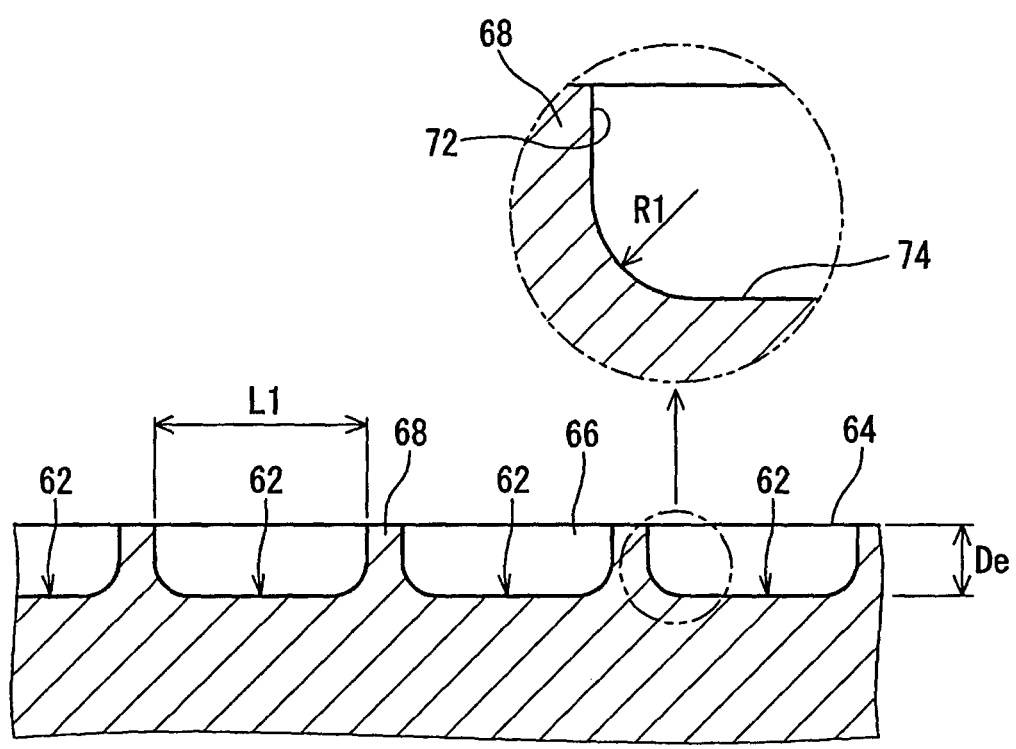
FIG. 4 is a cross-sectional view, cut with a cylindrical plane in a circumferential direction, showing a dimple section in FIG. 1.

FIG. 4 is a cross-sectional view showing part of the tire in FIG. 1. In FIG. 4, a direction to the left or right is a circumferential direction, and a direction to the upper or lower portion is an axial direction. Arrow (De) in FIG. 4 indicates the depth of a dimple 62. Depth (De) is the measurement from the upper-edge surface of lands (ribs 66, 68) to the bottom of a dimple 62. From the viewpoint of generating more turbulence, depth (De) is preferred to be no less than 0.5 mm, and is especially preferred to be no less than 1.0 mm. From the viewpoint of making tire 2 lightweight, depth (De) is preferred to be no greater than 4.0 mm, and is especially preferred to be no greater than 3.0 mm. In the present embodiment, depths (De) of all dimples 62 are set to be substantially the same. However, that is not the only option. Rubber thicknesses of the outer side in a carcass are likely to differ depending on the radial positions. Depth (De) may be set different accordingly.

A dimple 62 includes side surface 72 and bottom surface 74. A dimple 62 has four side surfaces 72. A side surface 72 shown in the drawing corresponds to a side surface (wall surface) of a longitudinal rib 68. A longitudinal rib 68 has a side surface 72 on each of its circumferential sides. A side surface 72 is contiguous to the upper-edge surface of longitudinal rib 68. Bottom surface 74 is contiguous to side surfaces 72. Corners of side surfaces 72 and bottom surface 74 are rounded. Because of such rounded corners, stress is suppressed from concentrating on the corners, thus preventing cracks. Arrow (R1) in FIG. 4 is a curvature radius of the rounded corners. From the viewpoint of preventing cracks, curvature radius (R1) is preferred to be no less than 0.5 mm. From the viewpoint of making the tire lightweight, curvature radius (R1) is preferred to be no greater than 2.0 mm. Although not shown in the drawing, lateral rib 66 also has side surfaces (wall surfaces) on each of its radial sides. Corners of its side surfaces and bottom surface 74 are also rounded at the above curvature radius (R1).

Generally speaking, the profile of a tire is determined at the time of tire design. That is called a design profile surface. A design profile surface is referred to as a tire surface shape obtained by arranging rubber with a predetermined thickness on the outer side of a carcass line that is designed based on the concept of the natural equilibrium profile, for example. Based on the design profile surface, dimples are added to the surface, and the cavity surface of a tire die is determined. Side surface 36 of the design profile surface is determined by combining one or more arcs. When side surface 36 is formed with multiple arcs, the curvature radii of adjacent arcs are inevitably different from each other.

FIG. 1 shows design profile surface (DP) of side surface 36 in a double-dotted line. Dimples 62 are formed on design profile surface (DP). A dimple 62 is formed to recede from design profile surface (DP) toward the inner side of a tire, for example. The portion that is not recessed is a land. As described, to make the tire lightweight, a dimple 62 is preferred to be formed to recede from design profile surface (DP) toward the inner side of a tire to a predetermined depth (H). Depth (H) is a distance from design profile surface (DP) to the bottom of a dimple 62, and is different from depth (De) from the upper-edge surface of a land (ribs 66, 68) to the bottom of the dimple 62.

Meanwhile, when recessed portions from design profile surface (DP) toward the inner side of a tire are all formed to be the same, a portion of the outer side of the carcass may result in a significantly small rubber thickness on side surface 36 of the tire. Generally, when the rubber thickness of the outer side of a carcass is greater, depth (H) from design profile surface (DP) to the bottom of a dimple 62 is set greater, while the rubber thickness is smaller, depth (H) is set smaller. For a dimple with smaller depth (H) from design profile surface (DP), to maintain the aforementioned constant dimple depth (De), a rib is formed to protrude by a desired amount on design profile surface (DP). For example, to form a dimple with a depth (H) of 0 mm from design profile surface (DP), a rib is formed to protrude by a height (De) that is the same as dimple depth (De).

As shown in FIG. 1, multiple dimples are formed to have different depths (H) from design profile surface (DP) in the present embodiment. Dimples aligned in the same circumferential row have the same depth (H). Dimples between different rows may have different depths (H). Dimples positioned radially adjacent to each other may have different depths (H).

In a tire shown in FIG. 1, dimples (62b) of second row (B) to dimples (62e) of fifth row (E) all have the same depth (H) from design profile surface (DP), which is set at 0 mm. Therefore, heights are all the same in lateral rib (66t) of second row (T) between second dimple row (B) and third dimple row (C), lateral rib (66u) of third row (U) between third dimple row (C) and fourth dimple row (D), and lateral rib (66v) of fourth row (V) between fourth dimple row (D) and fifth dimple row (E).

Heights on both side surfaces in lateral ribs (66t, 66u, 66v) are the same as each other. Namely, in lateral ribs (66t, 66u, 66v), the height from the dimple bottom to the upper edge at the radially inner side surface (66Ii) is the same as the height from the dimple bottom to the upper edge at the radially outer side surface (661o). Such lateral ribs (66t, 66u, 66v) are referred to as first lateral ribs 661.

Figure 5:
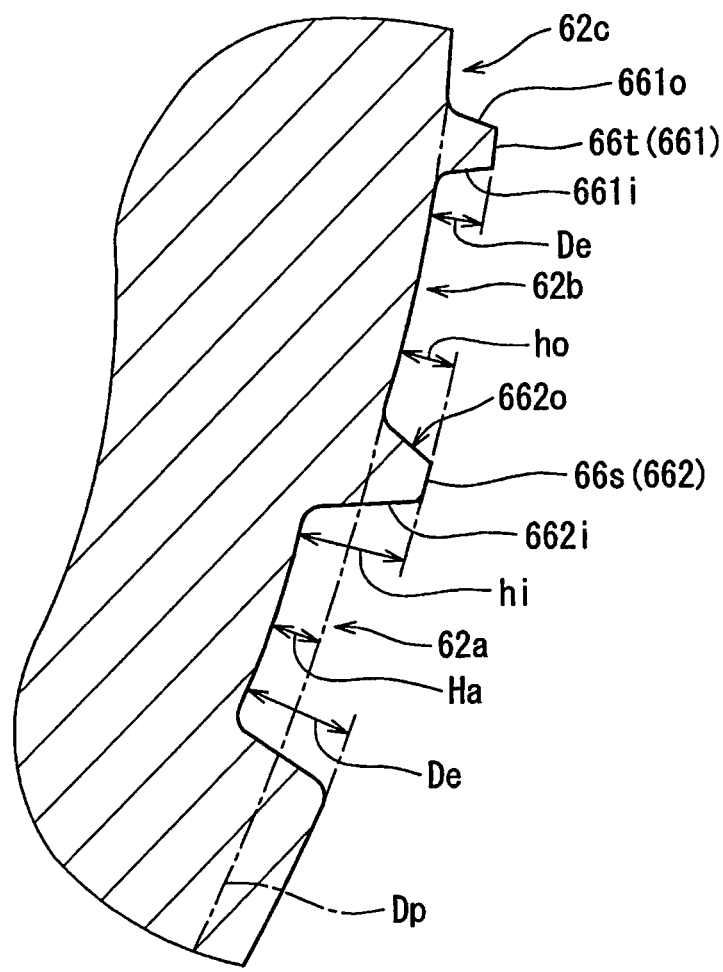
FIG. 5 is an enlarged cross-sectional view showing region "V" in FIG. 1.

As is clear when referring to FIG. 5 as well, only depth (Ha) from design profile surface (DP) in a dimple (62a) of first row (A) is different from depth (H) (=0) from design profile surface (DP) in dimples (62b, 62c, 62d, 62e) in the other rows (B, C, D, E). Depth (Ha) of dimple (62a) of first row (A) is set greater than depth (H) (=0) from design profile surface (DP) in dimples (62b, 62c, 62d, 62e) in other rows.

The reason for the above is, in the vicinity of the bead section, the rubber thickness at the outer side of carcass ply 42 usually has a greater thickness. The rubber thickness at the outer side of carcass ply 42 at the side section is set thinner in the vicinity of tire maximum width point (P). The reason for that is to reduce hysteresis loss and rolling resistance by making the rubber mass smaller in the vicinity of tire maximum width point (P). In the present embodiment, a dimple near tire maximum width point (P) has a depth (H) of 0 mm from design profile surface (DP). The rubber thickness increases gradually toward the bead section. Therefore, dimples near the bead section are designed to be recessed greater from design profile surface (DP) than dimples in other portions.

Accordingly, regarding lateral rib (66s) of first row (S) between first dimple row (A) and second dimple row (B), heights (hi, ho) of both of its side surfaces (662i, 662o) are different from each other. Namely, in lateral rib (66s), height (hi) from the dimple bottom to the upper edge at the inner side surface (662i) is set greater than height (ho) from the dimple bottom to the upper edge at outer side surface (662o). Such lateral rib (66s) is referred to as second lateral rib 662. Tire 2 is provided with first lateral rib 661 and second lateral rib 662. Heights (hi, ho) each indicate the distance from the upper edge of a lateral rib to the dimple bottom.

As described above, in the range of a tire side section with a greater rubber thickness at the outer side of a carcass ply, by setting a greater depth (H) from design profile surface (DP), the durability of a sidewall is enhanced while making the tire lightweight.

However, if the rubber thickness at the outer side of a carcass is less than 1.5 mm, cracks may occur while driving. Thus, an approximate rubber thickness of at least 2 mm is secured at the outer side of the carcass in side surface 36. When depth (H) above is determined, a rubber thickness from the dimple bottom to the outer surface of the carcass ply is not to be below 2 mm. The minimum rubber thickness may be changed depending on the type of a tire, driving conditions of a tire and the like.

Figure 6:
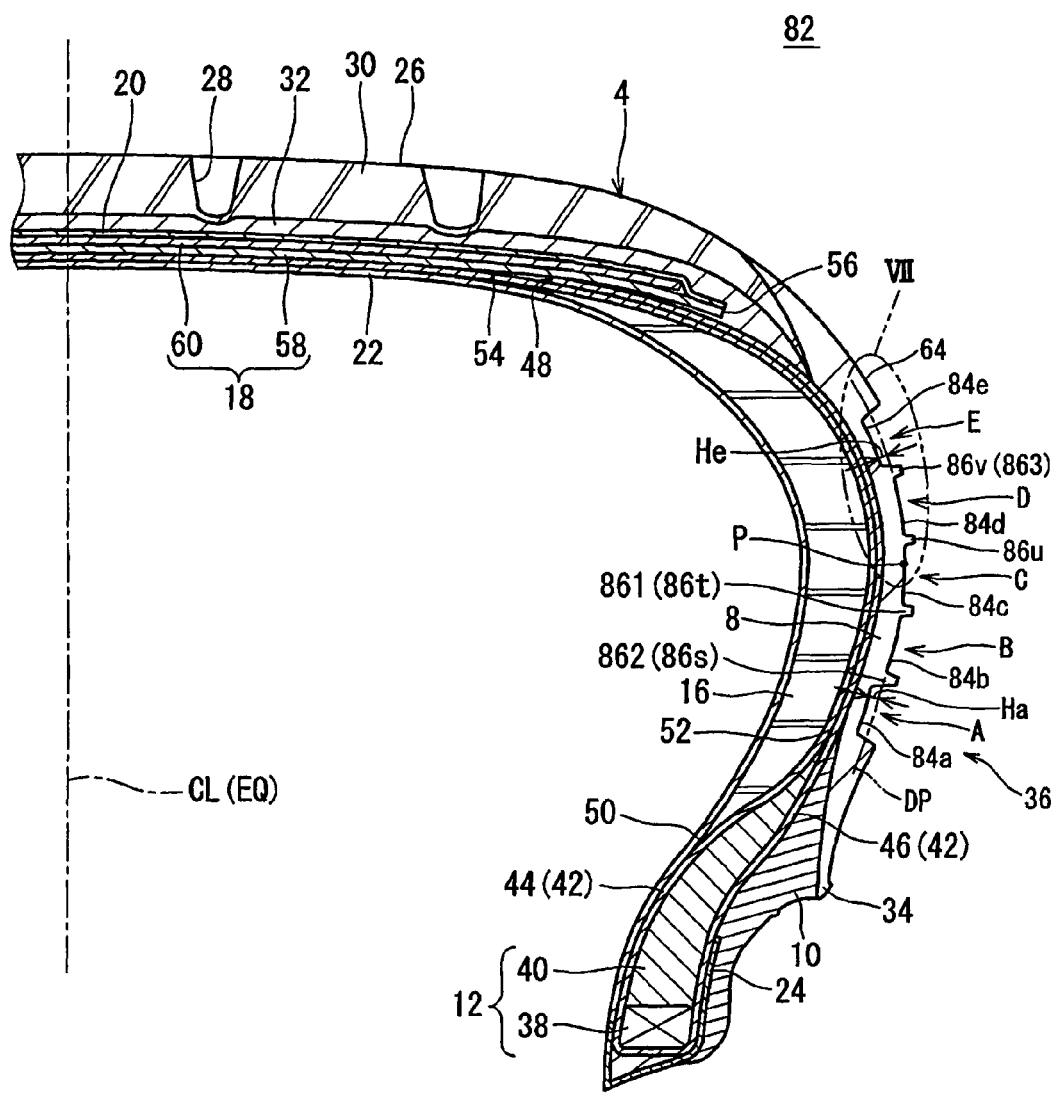
FIG. 6 is a cross-sectional view, cut with a plane perpendicular to a circumferential direction, showing a tire according to another embodiment of the present invention.

FIG. 6 shows another tire 82. The same as tire 2 in FIG. 1, tire 82 is provided with five dimple rows (A, B, C, D, E). In tire 82, dimples (84e) of fifth row (E) and lateral rib (86v) of fourth row (V) are different from their counterparts (62e) and (66v) in tire 2 shown in FIG. 1. Since structures of tire 82 except for those of dimples 84 and lateral rib 86 are the same as those of tire 2 in FIG. 1, the same numeral reference numbers are assigned to them and their detailed descriptions are omitted here.

In tire 82, depth (Ha) from design profile surface (DP) in a dimple (84a) of the first row, and depth (He) from design profile surface (DP) in a dimple (84e) of the fifth row are both set greater than depth (H) (=0) from design profile surface (DP) in dimples (84b, 84c, 84d) of other rows. Namely, the same as in tire 2 of FIG. 1, depth (Ha) from design profile surface (DP) in a dimple (84a) of the first row is greater than depth (H) (=0) from design profile surface (DP) in dimples (84b, 84c, 84d) of the second to fourth rows.

Therefore, lateral rib (86s) of first lateral rib row (S) is categorized as second lateral rib 862, the same as in tire 2 shown in FIG. 1.

Figure 7:
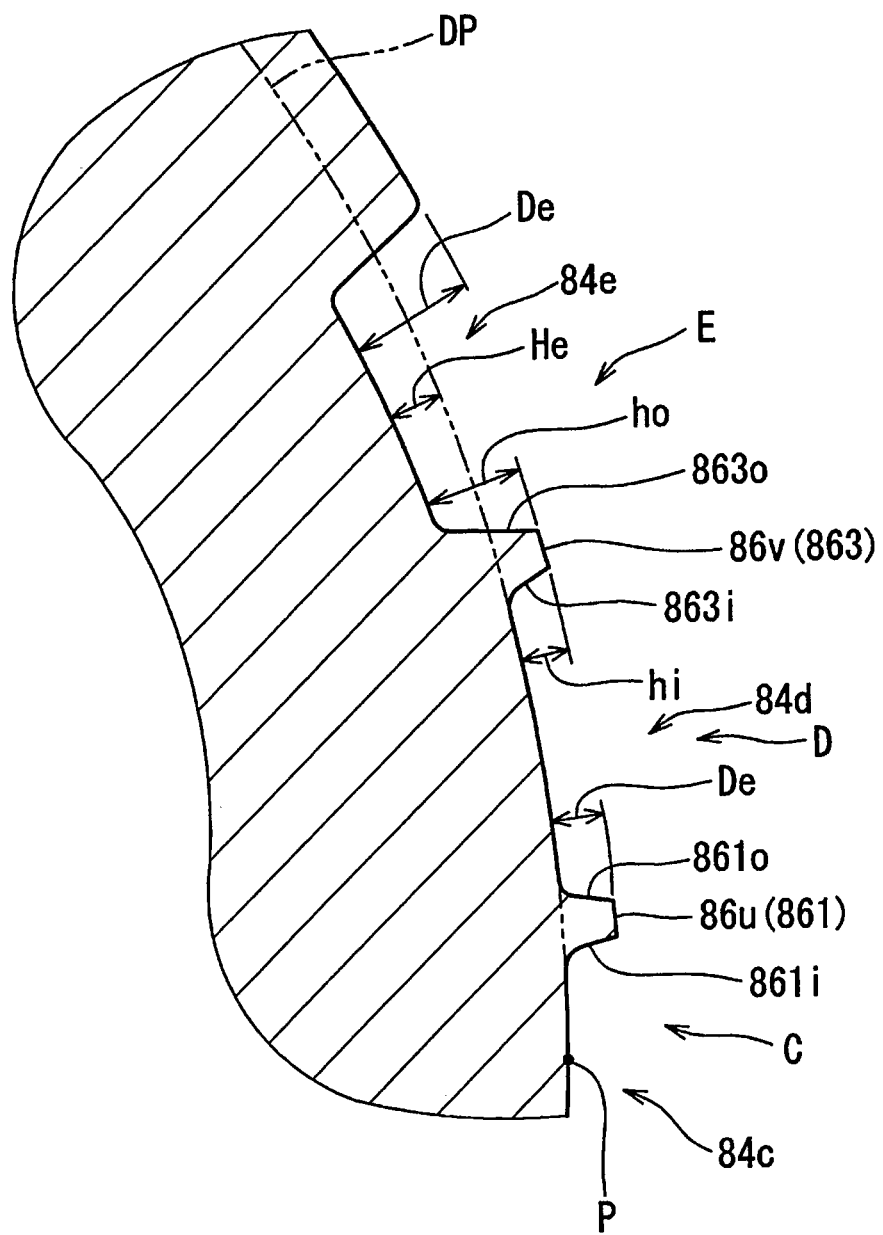
FIG. 7 is an enlarged cross-sectional view showing region "VII" in FIG. 6.

As is clear when referring to FIG. 7 as well, in tire 82, depth (He) from design profile surface (DP) in a dimple (84e) of the fifth row is also greater than depth (H) (=0) from design profile surface (DP) in dimples (84b, 84c, 84d) of the second through fourth rows. That is because the rubber thickness on the outer side of carcass ply 42 is generally greater in the vicinity of the buttress section so as to make a smooth transition of side surface 36 from tread 4 toward sidewall 8. Accordingly, dimples near the buttress section are designed to recede more from design profile surface (DP) than dimples in other sections.

Therefore, in lateral rib (86v) of fourth row (V) between fourth dimple row (D) and fifth dimple row (E), height (h) is set different on each of both side surfaces (863i, 863o). Namely, in lateral rib (86v), height (hi) from the dimple bottom to the upper edge at inner side surface (863i) is set smaller than height (ho) from the dimple bottom to the upper edge at outer side surface (863o). Such lateral rib (86v) is referred to as third lateral rib 863. Tire 82 is provided with first lateral rib 861, second lateral rib 862 and third lateral rib 863.

When a dimple sandwiched between first lateral rib (661 or 861) and second lateral rib (662 or 862) respectively, and a dimple sandwiched between first lateral rib 861 and third lateral rib 863, while including a higher side surface at the side surfaces of the second lateral rib and the third lateral rib respectively, depth (De) from the upper-edge surface of the aforementioned rib to the dimple bottom is determined by the height of the lower side surface of first lateral rib (661 or 861).

In tire 2 of FIG. 1, only lateral rib (66s) of first row (S) is categorized as second lateral rib 662, and lateral ribs (66t, 66u, 66v) in other rows (T, U, V) are all categorized as first lateral rib 661. In tire 82 of FIG. 6, lateral rib (86s) of first row (S) is categorized as second lateral rib 862, lateral rib (86v) of fourth row (V) as third lateral rib 863, and each of lateral ribs (86t, 86u) of other rows (T, U) as first lateral rib 861. By so setting a tire, the durability of sidewall 8 is maintained, a lightweight tire property is achieved near bead 12, and total cooling effects of dimples are exhibited. General running durability and runflat running durability are both achieved.

However, tires are not limited to the above structures. Depending on the rubber thickness of the outer side of the carcass at the tire side section, positions of second lateral rib (662 or 862) as well as the position of third lateral rib 863 may be changed. Second lateral rib (662 or 862) may be formed in a row other than first row (S). Third lateral rib 863 may be formed in a row other than fourth row (V). In addition, depending on the rubber thickness of the outer side of the carcass at the tire side section, various combinations of lateral ribs may be employed. For example, a second lateral rib may be formed in multiple rows. A third lateral rib may be formed in multiple rows. It is another option for a tire not to include first lateral rib (661 or 861).

As described above, the rubber thickness of the outer side of the carcass is set relatively thin near the tire maximum width point (P). Thus, to avoid even thinner rubber thickness, second lateral rib (662 or 862) is positioned radially inward from tire maximum width point (P). Second lateral rib (662 or 862) is preferred to be formed farther inward than a position that is 5 mm radially inward from tire maximum width point (P). For the same reason, third lateral rib 863 is preferred to be positioned radially outward from tire maximum width point (P). It is more preferable if third lateral rib 863 is formed farther outward than a position that is 2 mm radially outward from tire maximum width point (P).

In addition, if a dimple includes tire maximum width point (P) in the range it is formed in, its depth (H) from the design profile surface is preferred to be zero. If a dimple is formed in the range between a position 2 mm radially outward from tire maximum width point (P) and a position 5 mm radially inward from tire maximum width point (P), it is more preferred that its depth (H) from the design profile surface be set as zero. Also, a dimple whose depth (H) from the design profile surface is not zero, namely, a dimple formed to be recessed from the design profile surface into the tire, is preferred to be formed farther inward than a position that is 5 mm radially inward from tire maximum width point (P) or farther outward than a position that is 2 mm radially outward from tire maximum width point (P).

Figure 8:
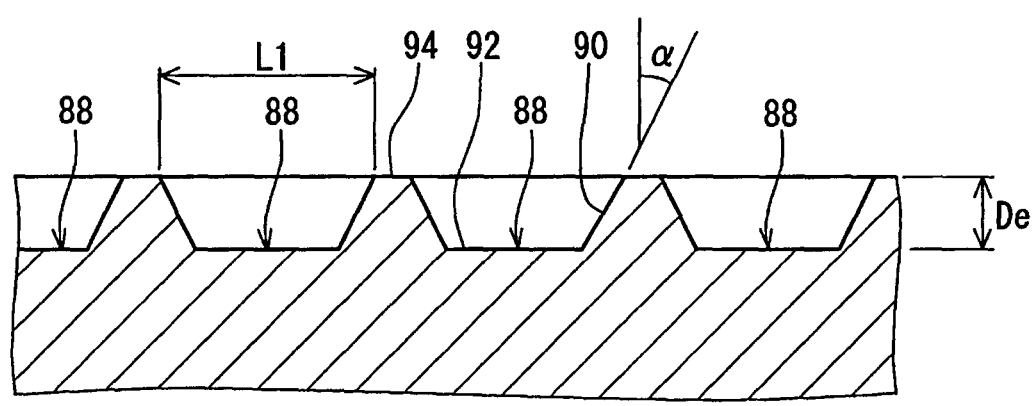
FIG. 8 is a cross-sectional view, cut with a cylindrical plane in a circumferential direction, showing a dimple section of a tire according to yet another embodiment of the present invention.

FIG. 8 is a cross-sectional view showing part of a tire according to yet another embodiment of the present invention. In FIG. 8, a direction to the left or right is a circumferential direction, and a direction to the upper or lower portion is an axial direction. FIG. 8 shows dimples 88. The pattern of dimples 88 is the same dimple pattern of tire 2 shown in FIG. 2.

A dimple 88 includes side surface 90 and bottom surface 92. Side surface 90 is contiguous to land 94. Bottom surface 92 is contiguous to side surface 90. Side surface 90 inclines with respect to a depth direction. In other words, side surface 90 is a slope. Turbulence is introduced toward the inside of a dimple 88 because of side surface 90. From such a point of view, the inclination angle ($\alpha$) of side surface 90 with respect to a depth direction is preferred to be no smaller than 30 degrees, and is especially preferred to be no smaller than 40 degrees. From the viewpoint of making the tire lightweight, inclination angle ($\alpha$) is preferred to be no greater than 60 degrees, and is especially preferred to be no greater than 50 degrees.

Figure 9:
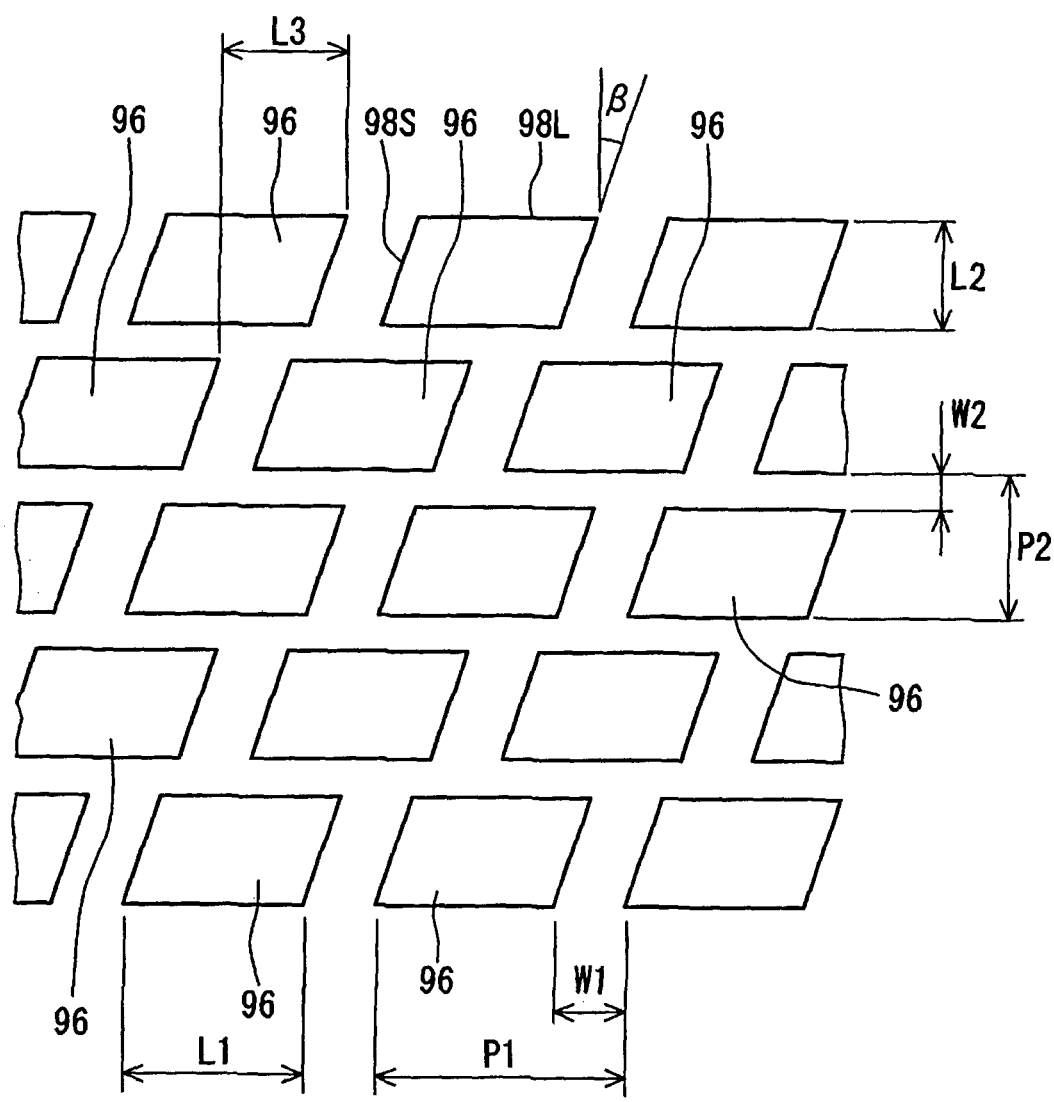
FIG. 9 is an enlarged front view showing part of the outer surface of a sidewall of a tire according to yet another embodiment of the present invention.

FIG. 9 is a front view showing part of a tire according to yet another embodiment of the present invention. FIG. 9 shows a sidewall of the tire. In FIG. 9, a direction to the left or right is a circumferential direction, and a direction to the upper or lower portion is an axial direction. FIG. 9 shows dimples 96.

The outline of a dimple 96 is a parallelogram. A dimple 96 includes long side (98L) and short side (98S). In a dimple 96, circumferential length (L1) is set greater than radial length (L2). Short side (98S) of a dimple 96 is inclined with respect to a radial direction. From the viewpoint of suppressing stress concentration, inclination angle ($\beta$) is preferred to be no greater than 20 degrees, and is especially preferred to be no greater than 15 degrees.

In the embodiments described above, examples of the outline of a dimple are a rectangle and a parallelogram with four rounded corners. However, the outline of a dimple is not limited to those, and it may be a rectangle, oval or ellipse. For example, in a dimple with the outline of an ellipse, the tire circumferential length is set greater than the tire radial length. Such a dimple does not have a corner. Stress is suppressed from concentrating in such a dimple.

Among dimple rows (A, B, C, D, E) shown in FIGS. 1 and 6, first row (A) is located at a position near the radially outer edge of apex 40. Second row (B) is located near the maximum thickness point of load bearing layer 16. Fifth row (E) is located near the buttress. Depending on the size of a tire, purposes of a tire and the like, positions of dimples (62 or 84) are appropriately determined.

Preferred radial positions of dimples (62 or 84) in runflat tire (2 or 82) are at:
(1) a radially outer edge of apex 40;
(2) the maximum thickness point of load bearing layer 16;
(3) a radially outer edge of a clinch section 10; and
(4) a position with the smallest curvature radius of sidewall 8 when a tire runs flat.

When a tire runs flat, stress concentrates on the radially outer edge of apex 40. By setting such a position to correspond to a radial position of dimple (62 or 84), peeling among rubber materials is suppressed from occurring near the radially outer edge of apex 40.

When a tire runs flat, more heat is generated at the maximum thickness point of load bearing layer 16. By setting such a position to correspond to a radial position of dimple 62, peeling among rubber materials is suppressed from occurring near the maximum thickness point of load bearing layer 16.

When a tire runs flat, stress concentrates on the radially outer edge of clinch section 10. By setting such a position to correspond to the radial position of dimple (62 or 84), peeling among rubber materials is suppressed from occurring near the radially outer edge of clinch section 10.

When a tire runs flat, stress concentrates in a position with the smallest curvature radius in sidewall 8. By setting such a position to correspond to the radial position of dimple (62 or 84), peeling among rubber materials is suppressed from occurring near such a position. An example of a position with the smallest curvature radius is one near the buttress.

To spare tire marking space or the like, part of a region where dimple (62 or 84) is supposed to be formed may be set as a land. In such a portion, dimple (62 or 84) is not present. The rate of a no-dimple area is preferred to be 20% or less, and is especially preferred to be 10% or less.

Examples of tires for the embodiments described above are runflat tires. However, application of the present invention is not limited to runflat tires. Heat radiation is facilitated by dimples (62 or 84) in regular tires as well as in runflat tires.

Unless otherwise specified, the measurements and angles of each portion of a tire are obtained when the tire is mounted on a normal rim and air is filled in the tire at a normal inflation pressure. No load is exerted on a tire at the time of measurement. In the present application, a normal rim indicates a rim regulated by a regulatory system that includes standards for the tire. Normal rims are "Normal Rim" in JATMA regulations, "Design Rim" in the TRA regulations and "Measuring Rim" in the ETRTO regulations. In the present application, a normal inflation pressure indicates the air pressure regulated by a regulatory system that includes standards for the tire. For example, it is "Maximum Air Pressure" under JATMA regulations, maximum value described in "Tire Load Limits at Various Cold Inflation Pressures" under TRA regulations, and "Inflation Pressure" under ETRTO regulations. However, for a passenger tire, measurements and angles are taken when the inflation pressure is at 180 kPa.

EXAMPLES

Effects of an embodiment according to the present invention are identified by the following examples. However, the present invention is not limited to the description of the examples.

Example 1

A runflat tire shown in FIG. 1 was prepared as Example 1. The tire size was "235/55R18." The tire is provided with numerous rectangular dimples. Four corners of the rectangular dimples are each rounded. Dimples are aligned in first to fifth rows. The five rows are arrayed as concentric circles in a circumferential direction. The first row is the closest to the bead section, and the fifth row is the closest to the tread. The design profile surface is set the same for all the tires. Depths (H) from the design profile surface are as shown in Table 1. A depth (H) of 0 mm indicates that the dimple bottom corresponds to design profile surface (DP). Types of each lateral rib between adjacent dimple rows (first lateral rib, second lateral rib, third lateral rib) are shown in Table 1. At tire maximum width point (P) in a dimple of the third row, the rubber thickness from a dimple bottom to the outer surface of carcass profile 42 is shown in Table 1.

Example 2 and 3 and Comparative Example 2

Tires were prepared in Example 2 and 3 and Comparative Example 2 the same as in Example 1, except for those described below and shown in Table 1. Namely, dimple depth (H) from the design profile, types of lateral ribs between adjacent dimple rows, and the rubber thickness from the dimple bottom to the outer side of carcass profile 42 at tire maximum width point (P) are shown in Table 1.

Comparative Example 1

A tire was prepared for Comparative Example 1 the same as in Example 1 except for those described below and shown in Table 1. Namely, first, no dimple is formed in a range from the third row to the fifth row. Depth (H) from the design profile surface of dimples in the first and second rows, types of lateral ribs between adjacent dimple rows, and the rubber thickness in the outer side of carcass profile 42 at tire maximum width point (P) are shown in Table 1.

Example 4 Through 8

Tires were prepared in Example 4 through 8 the same as in Example 1, except for those described below and shown in Table 2. Namely, dimple depth (H) from the design profile surface, types of lateral ribs between adjacent dimple rows, and the rubber thickness from the dimple bottom to the outer side of carcass ply 42 at tire maximum width point (P) are shown in Table 2. Example 5 is a runflat tire having the structure shown in FIG. 6.

Runflat Durability Testing

Test tires were each mounted on a normal rim with a size of 7J. Air was filled in each tire to have an inflation pressure of 200 kPa. Then, the valve core of each tire was taken out so as to set the inner pressure of the tire to be atmospheric. Each tire was run on a drum while a load of 5.2 kN was exerted on the tire. The running speed was 80 km/h. The running distance until when abnormal noise was observed was recorded. The results in index numbers are shown in Table 1 and 2. The more preferred results are indicated by the higher values.

General Durability Testing

Test tires were each mounted on a normal rim with a size of 7J. Air was filled in each tire to have an inflation pressure of 200 kPa. Each tire was run on a drum while a load of 8.0 kN was exerted on the tire. The running speed was 80 km/h. The running distance was 15000 km. After each run was finished, the number of cracked dimples was visually observed. The rate (%) of the number of cracked dimples among all the dimples in each tire is shown in Table 1 and 2. The preferred results are indicated by the lower values.

TABLE 1 evaluation results of dimple performance on side surface

| | | comparative example 1 | comparative example 2 | example 1 | example 2 | example 3 |
|---|---|---|---|---|---|---|
| depth (H) (mm) from design profile surface to dimple bottom and type of lateral rib | 5th row | none | 1.8 | 0 | 0 | 0 |
| | lateral rib | none | 1st | 1st | 1st | 1st |
| | 4th row | none | 1.8 | 0 | 0 | 0 |
| | lateral rib | none | 1st | 1st | 1st | 1st |
| | 3rd row | none | 1.8 | 0 | 0 | 0 |
| | lateral rib | none | 1st | 1st | 2nd | 2nd |
| | 2nd row | 1.8 | 1.8 | 0 | 1.8 | 1.8 |
| | lateral rib | 1st | 1st | 2nd | 1st | 3rd |
| | 1st row | 1.8 | 1.8 | 1.8 | 1.8 | 0 |
| thickness (mm) from dimple bottom of 3rd row (maximum width point) to carcass | | 2.5 | 0.7 | 2.5 | 2.5 | 2.5 |
| runflat running distance in runflat durability test (index) | | 100 | 120 | 115 | 120 | 110 |
| rate of cracking (%) in durability test under normal conditions | | 0 | 72 | 0 | 0 | 0 |

TABLE 2 evaluation results of dimple performance on side surface

| | | example 4 | example 5 | example 6 | example 7 | example 8 |
|---|---|---|---|---|---|---|
| depth (H) (mm) from design profile surface to dimple bottom and type of lateral rib | 5th row | 0 | 1.8 | 1.8 | 1.8 | 1.8 |
| | lateral rib | 1st | 3rd | 3rd | 3rd | 3rd |
| | 4th row | 0 | 0 | 0 | 0 | 0 |
| | lateral rib | 1st | 1st | 1st | 1st | 1st |
| | 3rd row | 0 | 0 | 0 | 0 | 0 |
| | lateral rib | 2nd | 1st | 2nd | 2nd | 2nd |
| | 2nd row | 1.8 | 0 | 1.8 | 1.8 | 1.8 |

TABLE 2-continued evaluation results of dimple performance on side surface

|  | example 4 | example 5 | example 6 | example 7 | example 8 |
|---|---|---|---|---|---|
| lateral rib | 2nd | 2nd | 1st | 3rd | 2nd |
| 1st row | 3.0 | 1.8 | 1.8 | 0 | 3.0 |
| thickness (mm) from dimple bottom of 3rd row (maximum width point) to carcass | 2.5 | 2.5 | 2.5 | 2.5 | 2.5 |
| runflat running distance in runflat durability test (index) | 130 | 120 | 125 | 115 | 135 |
| rate of cracking (%) in durability test under normla conditions | 0 | 0 | 0 | 0 | 0 |

As shown in Table 1 and 2, the tire in each Example exhibits various excellent properties. From the evaluation results, it is clear that tires according to the embodiments of the present invention are more excellent than others.

The pneumatic tire according to an embodiment of the present invention is suitable for being equipped on various types of vehicles.

When a runflat tire continues to be driven when it is deflated, deformation and restoration of the load bearing layer are repeated, thus generating heat in the load bearing layer and causing the tire to undergo high temperatures. Such heat may damage rubber materials and cause peeling between the rubber materials in the tire. When damage or peeling occurs in a tire, it is impossible to drive on the tire. Thus, a runflat tire is desired to enable continuous driving for a certain duration even in a deflated state. In other words, what is desired is a runflat tire that is unlikely to sustain damage and peeling caused by heat.

Dimples generate air turbulence on a side surface. Turbulent airflow facilitates heat radiation from the tire into atmospheric air. The tire temperature is unlikely to rise.

Figure 10:
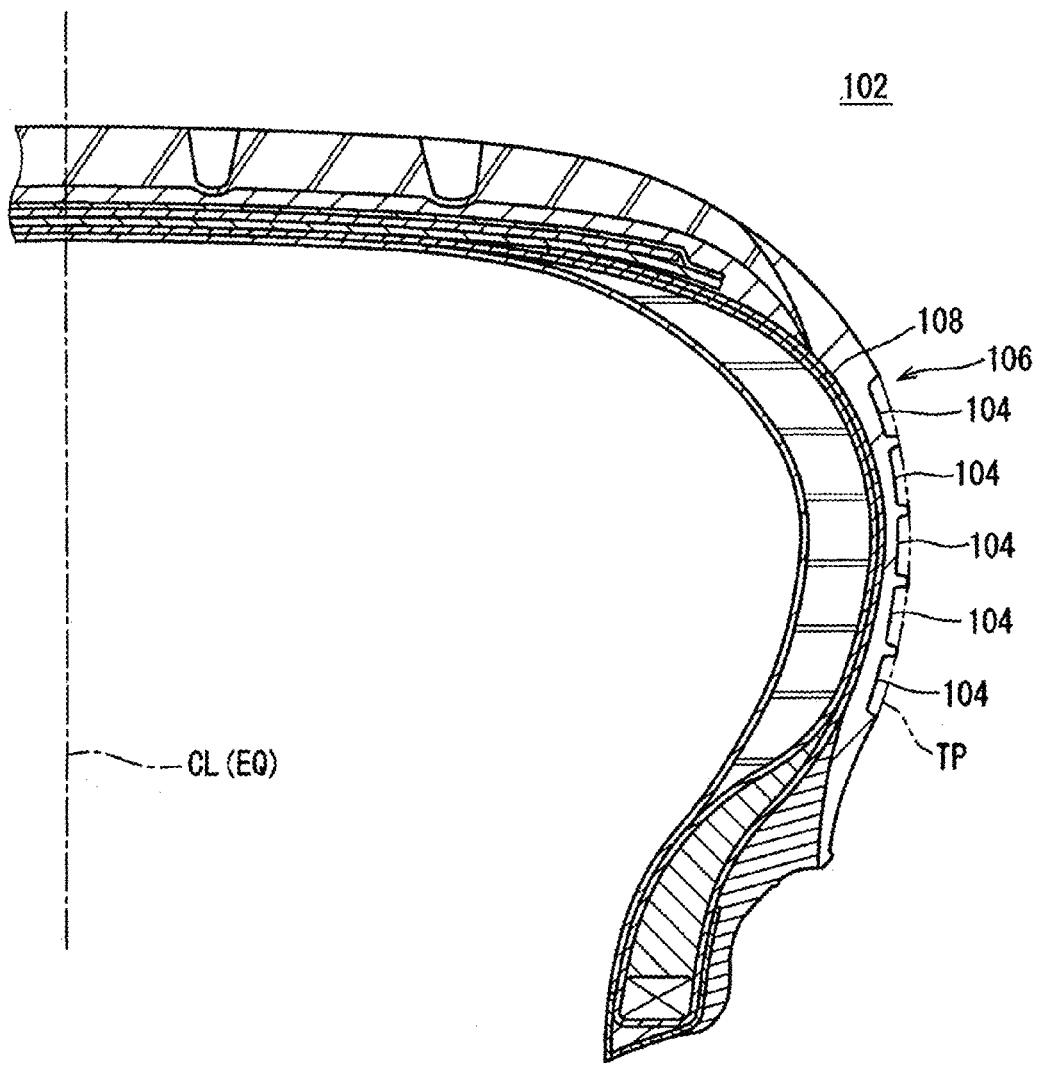
FIG. 10 a cross-sectional view, cut with a plane perpendicular to a circumferential direction, showing an example of a conventional tire.

As shown in FIG. 10, conventionally, after tire outline (TP) is determined in a design phase, dimple 104 is usually formed to recede into tire 102 to a predetermined depth from the outline (TP). That is preferable from the viewpoint of making tire 102 lightweight.

If dimples 104 are all formed to be the same from tire outline (TP) toward the inner side of tire 102, the rubber thickness of the outer side of carcass 108 may likely be too thin on side surface 106 of tire 102. To avoid such a condition, it may be an option to increase the rubber thickness of the outer side of carcass 108 in advance. However, that is contrary to making tire 102 lightweight.

According to an embodiment of the present invention, a lightweight pneumatic tire that exhibits excellent durability can be achieved.

A pneumatic tire according to an embodiment of the present invention is provided with the following: on a side surface where the tire maximum width point is located, multiple dimples aligned along multiple circumferential rows set as concentric circles with respect to the tire axis; lateral ribs positioned between radially adjacent dimples; and longitudinal ribs positioned between circumferentially adjacent dimples.

In such a tire, the lateral ribs each have a radially outer side surface and a radially inner side surface, the lateral ribs include a first lateral rib and a second lateral rib, at the first lateral rib, the height from the dimple bottom to the upper edge at the inner side surface is set the same as the height from the dimple bottom to the upper edge at the outer side surface; at the second lateral rib, the height from the dimple bottom to the upper edge at the inner side surface is set greater than the height from the dimple bottom to the upper edge at the outer side surface; and the second lateral rib is positioned radially inward from the tire maximum width point.

The second lateral rib is preferred to be positioned farther inward than a position that is 5 mm radially inward from the tire maximum width point.

The lateral ribs are preferred to include a third lateral rib whose height from the dimple bottom to the upper edge at the outer side surface is set greater than the height from the dimple bottom to the upper edge at the inner side surface, and the third lateral rib is preferred to be positioned radially outward from the tire maximum width point.

The third lateral rib is preferred to be positioned farther outward than a position that is 2 mm radially outward from the tire maximum width point.

The tire according to an embodiment of the present invention is preferred to be provided with a tread, a pair of sidewalls extending substantially inward from the edge of the tread in a radial direction, a pair of beads positioned substantially inward from a sidewall in a radial direction, and a carcass bridging between a bead and another bead along the inner side of the tread and sidewall. In such a tire, the rubber thickness from each dimple bottom to the outer surface of the carcass is preferred to be no less than 2 mm.

According to an embodiment of the present invention, a pneumatic tire achieves both light weight and enhanced sidewall durability.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
   a side wall having a side surface and a plurality of dimples formed on the side surface,
   wherein the side surface has the tire maximum width point, the plurality of dimples is aligned along at least three circumferential rows formed in a concentric form with respect to a tire axis such that the plurality of dimples in the circumferential rows forms a plurality of lateral ribs between radially adjacent dimples and a plurality of longitudinal ribs between circumferentially adjacent dimples, the lateral ribs each have a radially outer side surface and a radially inner side surface and include a first lateral rib and a second lateral rib, the first lateral rib is formed such that a height from each dimple bottom in the circumferential row forming the radially inner side surface of the first lateral rib to an upper edge at the radially inner side surface of the first lateral rib and a height from each dimple bottom in the circumferential row forming the radially outer side surface of the first lateral rib to an upper edge at the radially outer side surface of the first lateral rib are equal, the second lateral rib is formed such that a height from each dimple bottom in the circumferential row forming the radially inner side surface of the second lateral rib to an upper edge at the radially inner side surface of the second lateral rib is set greater than a height from each dimple bottom in the circumferential row forming the radially outer side surface of the second lateral rib to an upper edge at the radially outer side surface of the second lateral rib, and the second lateral rib is positioned radially inward from the tire maximum width point.

2. The pneumatic tire according to claim 1, further comprising:
a tread;
a pair of rubber side walls extending inward from edges of the tread in a radial direction, respectively;
a pair of beads positioned inward from the rubber side walls in the radial direction, respectively; and
a carcass bridging between the beads such that the carcass is extending along an inner side of the tread and rubber side walls,
wherein the pair of rubber side walls includes the side wall having the dimples and having a minimum rubber thickness measured from a dimple bottom of each of the dimples to an outer surface of the carcass which is set 2 mm or greater.

3. The pneumatic tire according to claim 1, wherein the second lateral rib is positioned farther inward than a position which is 5 mm radially inward from the tire maximum width point.

4. The pneumatic tire according to claim 3, further comprising:
a tread;
a pair of rubber side walls extending inward from edges of the tread in a radial direction, respectively;
a pair of beads positioned inward from the rubber side walls in the radial direction, respectively; and
a carcass bridging between the beads such that the carcass is extending along an inner side of the tread and rubber side walls,
wherein the pair of rubber side walls includes the side wall having the dimples and having a minimum rubber thickness measured from a dimple bottom of each of the dimples to an outer surface of the carcass which is set 2 mm or greater.

5. The pneumatic tire according to claim 3, wherein the plurality of lateral ribs includes a third lateral rib formed such that a height of the third lateral rib from each dimple bottom in the circumferential row forming the radially outer side surface of the third lateral rib to an upper edge at the radially outer side surface of the third lateral rib is set greater than a height from each dimple bottom in the circumferential row forming the radially inner side surface of the third lateral rib to an upper edge at the radially inner side surface of the third lateral rib, and the third lateral rib is positioned radially outward from the tire maximum width point.

6. The pneumatic tire according to claim 5, further comprising:
a tread;
a pair of rubber side walls extending inward from edges of the tread in a radial direction, respectively;
a pair of beads positioned inward from the rubber side walls in the radial direction, respectively; and
a carcass bridging between the beads such that the carcass is extending along an inner side of the tread and rubber side walls,
wherein the pair of rubber side walls includes the side wall having the dimples and having a minimum rubber thickness measured from a dimple bottom of each of the dimples to an outer surface of the carcass which is set 2 mm or greater.

7. The pneumatic tire according to claim 5, wherein the third lateral rib is positioned farther outward than a position which is 2 mm radially outward from the tire maximum width point.

8. The pneumatic tire according to claim 7, further comprising:
a tread;
a pair of rubber side walls extending inward from edges of the tread in a radial direction, respectively;
a pair of beads positioned inward from the rubber side walls in the radial direction, respectively; and
a carcass bridging between the beads such that the carcass is extending along an inner side of the tread and rubber side walls,
wherein the pair of rubber side walls includes the side wall having the dimples and having a minimum rubber thickness measured from a dimple bottom of each of the dimples to an outer surface of the carcass which is set 2 mm or greater.

9. The pneumatic tire according to claim 1, wherein the plurality of lateral ribs includes a third lateral rib formed such that a height of the third lateral rib from each dimple bottom in the circumferential row forming the radially outer side surface of the third lateral rib to an upper edge at the radially outer side surface of the third lateral rib is set greater than a height from each dimple bottom in the circumferential row forming the radially inner side surface of the third lateral rib to an upper edge at the radially inner side surface of the third lateral rib, and the third lateral rib is positioned radially outward from the tire maximum width point.

10. The pneumatic tire according to claim 9, further comprising:
a tread;
a pair of rubber side walls extending inward from edges of the tread in a radial direction, respectively;
a pair of beads positioned inward from the rubber side walls in the radial direction, respectively; and
a carcass bridging between the beads such that the carcass is extending along an inner side of the tread and rubber side walls,
wherein the pair of rubber side walls includes the side wall having the dimples and having a minimum rubber thickness measured from a dimple bottom of each of the dimples to an outer surface of the carcass which is set 2 mm or greater.

11. The pneumatic tire according to claim 9, wherein the third lateral rib is positioned farther outward than a position which is 2 mm radially outward from the tire maximum width point.

12. The pneumatic tire according to claim 11, further comprising:
a tread;
a pair of rubber side walls extending inward from edges of the tread in a radial direction, respectively;
a pair of beads positioned inward from the rubber side walls in the radial direction, respectively; and
a carcass bridging between the beads such that the carcass is extending along an inner side of the tread and rubber side walls,
wherein the pair of rubber side walls includes the side wall having the dimples and having a minimum rubber thickness measured from a dimple bottom of each of the dimples to an outer surface of the carcass which is set 2 mm or greater.

13. A pneumatic tire, comprising:
a tread;
a pair of rubber side walls extending inward from edges of the tread in a radial direction, respectively;
a pair of beads positioned inward from the rubber side walls in the radial direction, respectively; and
a carcass bridging between the beads such that the carcass is extending along an inner side of the tread and rubber side walls,
wherein the pair of rubber side walls includes a side wall having a side surface and a plurality of dimples formed on the side surface, the side surface has the tire maximum width point, the plurality of dimples is aligned along at least three circumferential rows formed in a concentric form with respect to a tire axis such that the plurality of dimples in the circumferential rows forms a plurality of lateral ribs between radially adjacent dimples and a plurality of longitudinal ribs between circumferentially adjacent dimples, the lateral ribs each have a radially outer side surface and a radially inner side surface and include a first lateral rib and a second lateral rib, the first lateral rib is formed such that a height from each dimple bottom in the circumferential row forming the radially inner side surface of the first lateral rib to an upper edge at the radially inner side surface of the first lateral rib and a height from each dimple bottom in the circumferential row forming the radially outer side surface of the first lateral rib to an upper edge at the radially outer side surface of the first lateral rib are equal, the second lateral rib is formed such that a height from each dimple bottom in the circumferential row forming the radially inner side surface of the second lateral rib to an upper edge at the radially inner side surface of the second rib is set greater than a height from each dimple bottom in the circumferential row forming the radially outer side surface of the second lateral rib to an upper edge at the radially outer side surface of the second lateral rib, and the second lateral rib is positioned radially inward from the tire maximum width point.

14. The pneumatic tire according to claim 13, further comprising:
a pair of runflat load bearing layers formed on axially inward positions of the pair of rubber side walls, respectively.

15. The pneumatic tire according to claim 13, wherein the second lateral rib is positioned farther inward than a position which is 5 mm radially inward from the tire maximum width point.

16. The pneumatic tire according to claim 15, wherein the plurality of lateral ribs includes a third lateral rib formed such that a height of the third lateral rib from each dimple bottom in the circumferential row forming the radially outer side surface of the third lateral rib to an upper edge at the radially outer side surface of the third lateral rib is set greater than a height from each dimple bottom in the circumferential row forming the radially inner side surface of the third lateral rib to an upper edge at the radially inner side surface of the third lateral rib, and the third lateral rib is positioned radially outward from the tire maximum width point.

17. The pneumatic tire according to claim 16, wherein the third lateral rib is positioned farther outward than a position which is 2 mm radially outward from the tire maximum width point.

18. The pneumatic tire according to claim 13, wherein the plurality of lateral ribs includes a third lateral rib formed such that a height of the third lateral rib from each dimple bottom in the circumferential row forming the radially outer side surface of the third lateral rib to an upper edge at the radially outer side surface of the third lateral rib is set greater than a height from each dimple bottom in the circumferential row forming the radially inner side surface of the third lateral rib to an upper edge at the radially inner side surface of the third lateral rib, and the third lateral rib is positioned radially outward from the tire maximum width point.

19. The pneumatic tire according to claim 18, wherein the third lateral rib is positioned farther outward than a position which is 2 mm radially outward from the tire maximum width point.

20. The pneumatic tire according to claim 18, further comprising:
a pair of runflat load bearing layers formed on axially inward positions of the pair of rubber side walls, respectively.

* * * * *